July 14, 1953   J. ZIMARIK   2,645,044
APPARATUS FOR PRESSING SHEETS
Filed Sept. 4, 1948   6 Sheets-Sheet 1

INVENTOR.
John Zimarik
BY
William Cleland
Attorney

July 14, 1953  J. ZIMARIK  2,645,044
APPARATUS FOR PRESSING SHEETS
Filed Sept. 4, 1948  6 Sheets-Sheet 2

INVENTOR.
John Zimarik
BY
William Cleland
Attorney

July 14, 1953 J. ZIMARIK 2,645,044
APPARATUS FOR PRESSING SHEETS
Filed Sept. 4, 1948 6 Sheets-Sheet 3

INVENTOR.
John Zimarik
BY
William Cleland
Attorney

INVENTOR.
John Zimarik
BY William Cleland
Attorney

July 14, 1953     J. ZIMARIK     2,645,044
APPARATUS FOR PRESSING SHEETS Filed Sept. 4, 1948     6 Sheets-Sheet 5

INVENTOR.
John Zimarik
BY William Cleland
Attorney

July 14, 1953  J. ZIMARIK  2,645,044
APPARATUS FOR PRESSING SHEETS
Filed Sept. 4, 1948  6 Sheets-Sheet 6

INVENTOR.
John Zimarik
BY William Cleland
Attorney

Patented July 14, 1953

2,645,044

UNITED STATES PATENT OFFICE 2,645,044

APPARATUS FOR PRESSING SHEETS

John Zimarik, Akron, Ohio

Application September 4, 1948, Serial No. 47,921

21 Claims. (Cl. 38—2)

This invention relates to apparatus for pressing sheets, and, in particular, relates to apparatus for folding and ironing bed sheets or the like.

Heretofore, the ironing and folding of bed sheets, for example, has been substantially a hand operation. Pressing machines have been provided, comprising two relatively movable heated plates adapted to be urged together to iron a sheet, but in such prior art devices the folding of the sheet was a slow, tedious hand operation. Moreover, the platens were required to be in horizontal position to facilitate the hand-folding and the pressing operations and hence the equipment required considerable floor space.

A general object of the present invention is to provide sheet-pressing and folding apparatus which is substantially automatic in operation progressively to fold and iron sheets with a minimum of hand operations.

Another object of the invention is to provide apparatus of the character described adapted to extend generally in a vertical plane, and to be of such relatively small narrow cross-section transversely through said plane whereby the apparatus will occupy only a relatively narrow strip of floor space.

Another object of the invention is to provide apparatus of the character described by which two or more separate units thereof may be operated by one operator within a relatively small area of floor space.

Another object of the invention is to provide improved means for starting a sheet into the pressing mechanism for a folding and pressing operation, with the minimum of danger of injury to the operator's hands.

Another object of the invention is to provide in apparatus of the character described improved means for supporting sheets in distended condition to be progressively fed into the folding means.

Another object of the invention is to provide in apparatus of the character described improved means for protecting the trailing portions of the sheets against fouling in the machine during the folding operations.

Another object of the invention is to provide, in apparatus of the character described, improved means for indexing according to the total length of a sheet to be folded, and automatically adjusting the folding means to provide a requisite depth of the fold for the sheet in predetermined proportion to said total length thereof.

Other objects of the invention will be manifest in the following brief description and the accompanying drawings.

Of the accompanying drawings.

Referring particularly to Figs. 1 to 4, 8 to 10, 13 and 18 of the drawings, the numeral 25 designates a generally rectangular framework, extending in a vertical plane, within which is mounted a bottom series of four vertically relatively fixed pressing plates or platens 26, 27, 28 and 29, arranged to have spaces 31, 32 and 33 therebetween for loose interfitting reception of three relatively thin vertically movable upper plates 34, 35 and 36.

Figure 1:
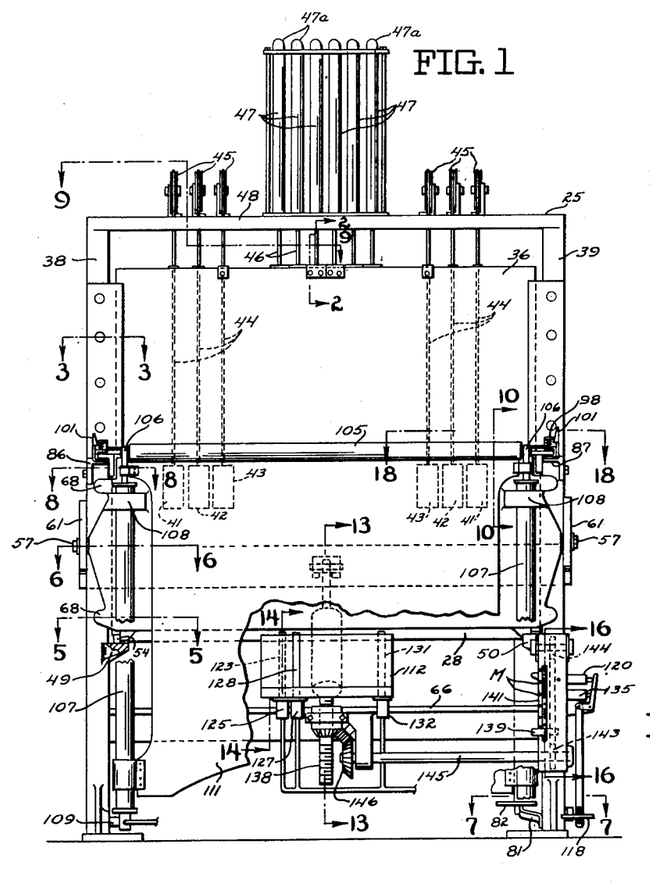
Fig. 1 is a front elevation partly broken away and in section, illustrating one embodiment of the improved folding and ironing apparatus.
Figure 2:
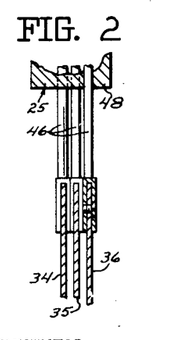
Fig. 2 is a fragmentary vertical cross-section taken substantially on the line 2—2 of Fig. 1.
Figure 3:
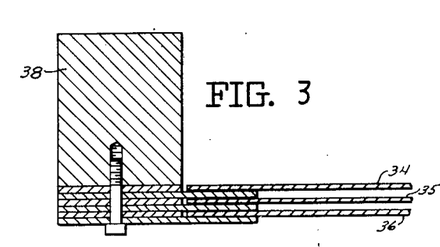
Fig. 3 is a fragmentary horizontal cross-section taken substantially on the line 3—3 of Fig. 1.
Figure 4:
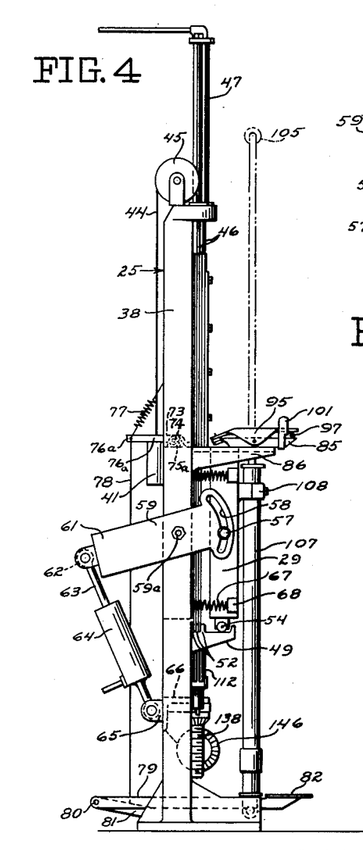
Fig. 4 is an end elevation of the improved apparatus as viewed from the left of Fig. 1.
Figures 8, 10, 11, 12:
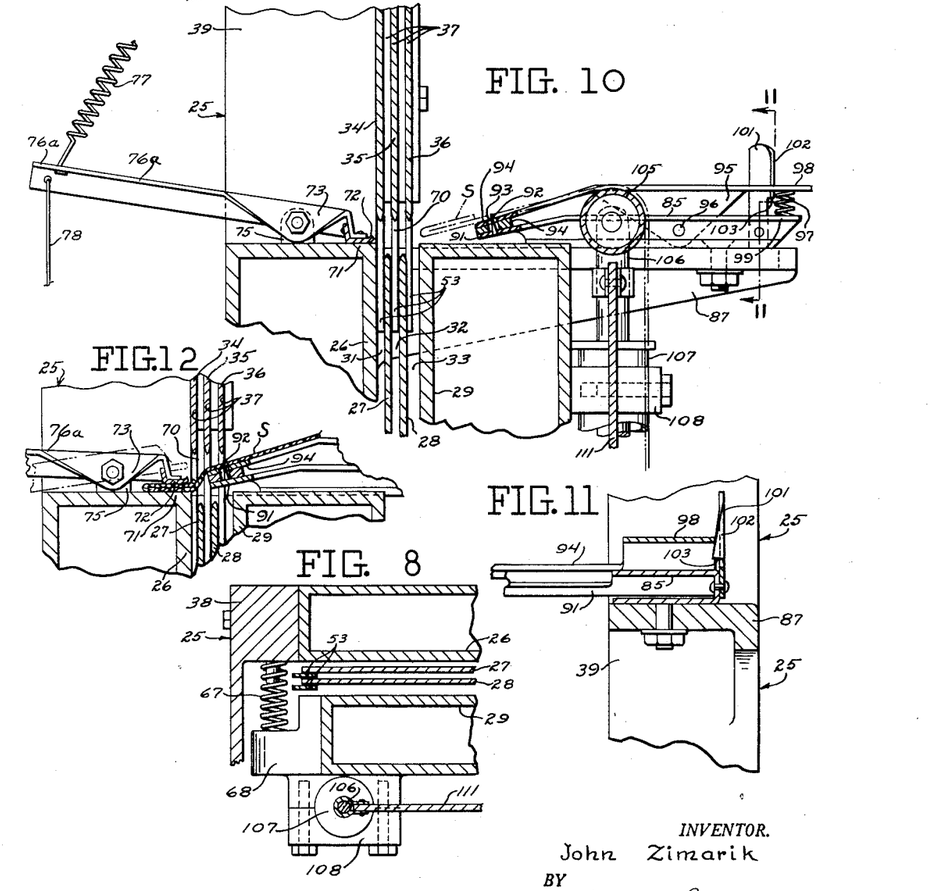
Fig. 8 is a fragmentary horizontal cross-section taken substantially on the line 8—8 of Fig. 1.
Fig. 10 is a fragmentary vertical cross-section taken substantially on the line 10—10 of Fig. 1, and particularly illustrating the sheet feeding and clamping mechanism.
Fig. 11 is a fragmentary vertical cross-section taken substantially on the line 11—11 of Fig. 10.
Fig. 12 is a fragmentary cross-section corresponding to Fig. 10, but illustrating another position of the mechanism thereof.
Figure 9:
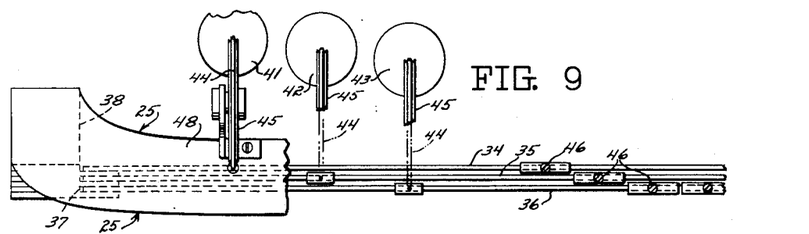
Fig. 9 is a top plan view, partly broken away and in section, of a portion of the upper part of the apparatus, substantially as viewed along the line 9—9 of Fig. 1.

The upper plates are normally maintained in an open or inoperative position, as best shown in Figs. 1, 10 and 12, as by means of pairs of counterweights 41, 42 and 43 suspended on cables 44, 44 trained over pulleys 45, 45 and attached to the upper edges of the plates 34, 35 and 36 respectively (see Figs. 1, 4 and 9). For urging the upper plates 34, 35 and 36 downwardly against the pull of the pairs of weights 41, 42 and 43, attached to the upper edges of the respective plates are upwardly extending rods 46, 46 of pistons reciprocable in cylinders 47, 47 extending upwardly from the top cross bar 48 of framework 25. The plates 34 to 36 are adapted to be so moved downwardly in succession for a sheet-pressing operation, as will be described later.

Figure 5:
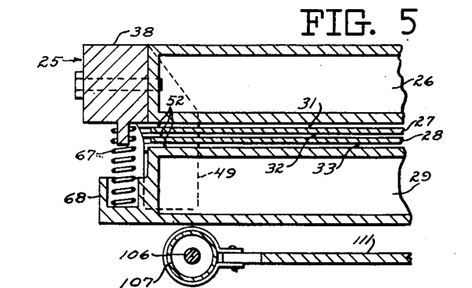
Fig. 5 is a fragmentary horizontal cross-section taken substantially on the line 5—5 of Fig. 1.
Figure 6:
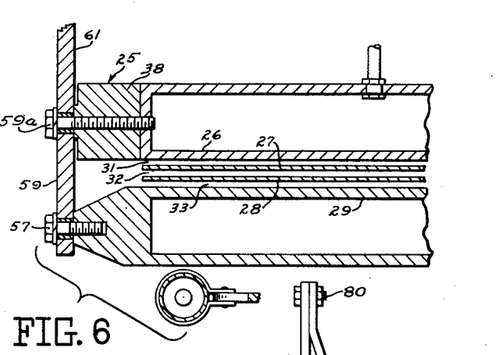
Fig. 6 is a similar fragmentary cross-section taken substantially on the line 6—6 of Fig. 1.
Figure 7:
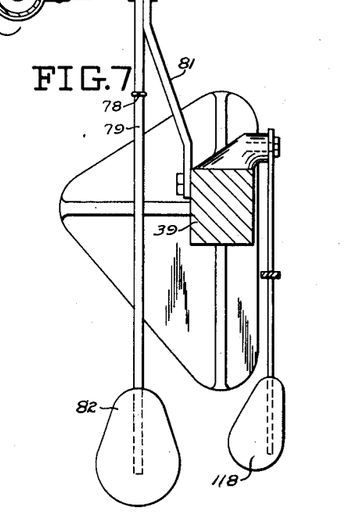
Fig. 7 is a cross-section taken substantially on the line 7—7 of Fig. 1.

Although the bottom series of pressing plates 26 to 29 are relatively fixed with respect to the vertical, they are relatively movable flatwise upon interfitting of the upper plates 34 to 36 in the spaces 31 to 33 in a manner to be described later. To this end the plate 26 is relatively fixedly mounted between the framework uprights 38 and 29, while the forwardly-disposed plate 29 is mounted to be relatively movable flatwise toward the plate 26, the thin plates 27 and 28 being mounted between the plates 26 and 29 by being supported on lugs 49 and 50 on the uprights 38 and 29, respectively, between spacing ribs 52, 52 thereon (see Figs. 1 and 5), the upper ends of these plates being loosely maintained substantially in parallelism by engagement of opposite upper corner portions thereof between short guide strips or ribs 53, 53 extending vertically on opposed faces of the uprights 38 and 39 (see Figs. 8 and 10). For this purpose the top plates 34, 35 and 36 are slightly narrower than the bottom plates 27 and 28 in order to clear the guide ribs 53. Plate 29 is supported for flatwise movement, as described above, by having roller bearings 54 at the bottom edge thereof engaging guide extensions 56 on the lugs 49, and having laterally extending pins 57, 57 at opposite sides of the plate engaging in arcuate slots 58 in arms 59, 59 pivoted to the uprights 38 and 39, these arms having rearward extensions 61 connected at the rear of the framework by a rod 62, to the central portion of which is pivotally connected a piston rod 63 extending into a fluid-pressure operated cylinder 64, pivotally connected at its lower end to a lug 65 secured to the crosspiece 66 between the uprights 38 and 39. The piston and cylinder means 64 is operable by fluid pressure from a suitable source (not shown), and control means to be described later, to move the extension 61 upwardly, thereby swinging the arm 59 downwardly and engaging the arcuate slotted portions 58 of the arms, which, being eccentric with the pivots 59a thereof, are effective to apply strong pressure to the pins 57 and thereby urge the forward platen 29 rearwardly flatwise toward the platen 26. This action of the platen 29 is preferably applied against the yielding action of springs 67, 67 between lugs 68, 68 on the platen 29 and the forward faces of the uprights 38 and 39 (Figures 4 and 8).

For applying requisite ironing heat during a folding and ironing operation on a sheet, the rear and forward plates or platens 26 and 29 are thicker than the others and are formed hollow for containing a fluid heating medium, such as steam from a suitable source (not shown), the heat from these platens being conducted to the folded sheet through the top and bottom plates in closed interfitted and flatwise pressed relationship thereof, as described above.

In the open or inoperative position of the apparatus, the lower edges of the upper plates 34 and 36 are spaced from the upper edge of the lower plates 26 to 29 (see Figures 10 and 12) as indicated at 70, to permit an operator to insert through the space thus provided the leading edge of a sheet S to present said leading edge between a pair of elongated clamping jaws, constituted by a flat upper edge portion 71 of plate or platen 26 and an angle iron 72 mounted between a pair of arms 73 and 74 (Figs. 4 and 18) pivoted on brackets 75 and 75a, respectively, on the upper face of platen 26. The arm 73 has a rearward extension 76 from which a tension spring 77 is stretched to upright 39, yieldingly to urge the jaw 72 toward jaw portion 71 of platen 26. The jaw 72 may be foot-operated as by means of a rod 78 extended from arm extension 76a to a pedal 79 pivoted at 80, rearwardly of the rod connection thereto, to a bracket 81, the lever 79 being extended forwardly and provided with a foot-engaging plate 82 to be at the front of the framework. Pedal 79 is adapted to be urged downwardly at will to open jaw 72 away from jaw 71 against the action of the spring 77.

Although the sheets may be manually inserted through opening 70 and between the jaws 71 and 72, this may be dangerous to the operator because of the closing operations of the sheet-folding and ironing plates and the ironing heat thereof. Accordingly, mechanical means is provided at the front of the apparatus for performing this operation, as best illustrated in Figures 1, 4, 10, 11, 12 and 18.

Figures 18, 19:
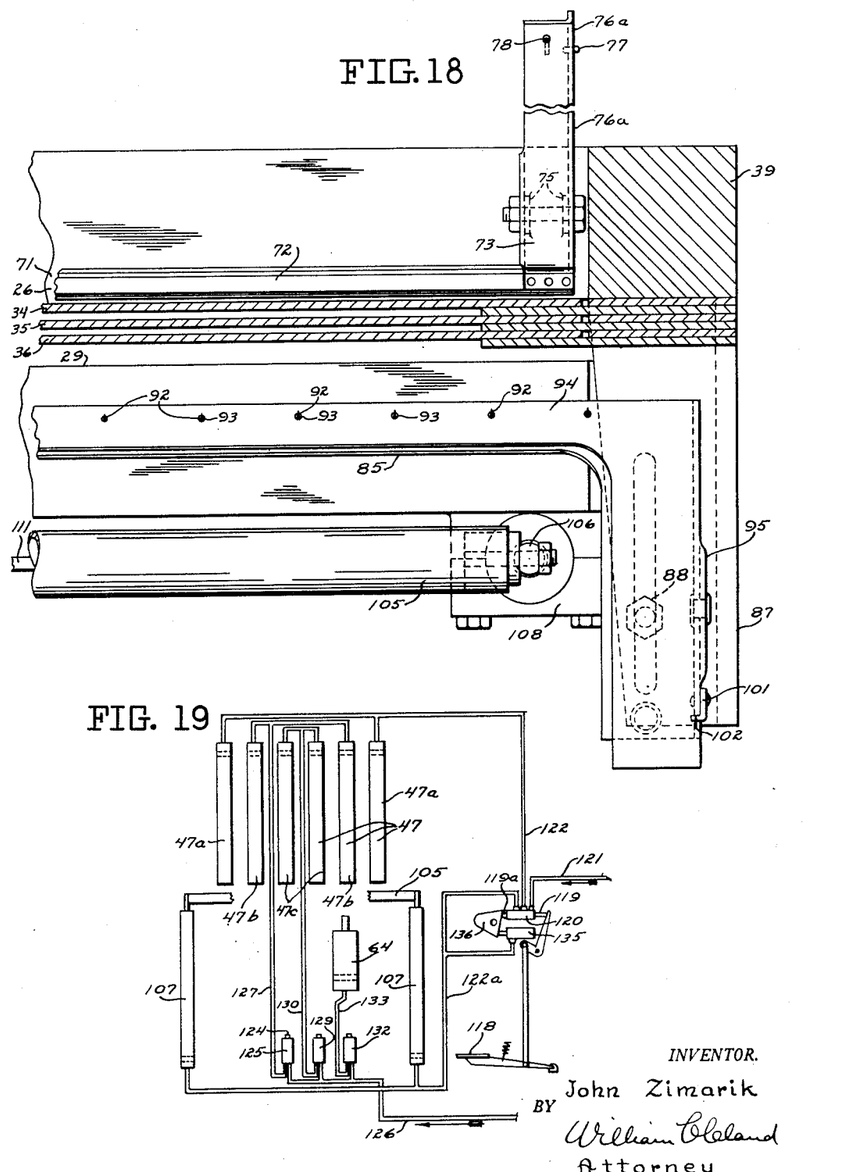
Fig. 18 is a fragmentary horizontal cross-section taken substantially on the line 18—18 of Fig. 1 and illustrating the sheet-feeding mechanism.
Fig. 19 is a schematic diagram of the piping and control circuit for operating the various fluid-pressure-actuated devices.

This mechanical feeding means includes an elongated, generally flat member 85, slidably secured at opposite lateral ends thereof to spaced lugs 86 and 87 on the forward faces of the uprights 38 and 39, respectively, as indicated at 88 in Figures 10 and 18, the member 85 being arranged to be manually or otherwise slidable in a horizontal plane from the front of the machine to present a laterally extending, elongated bar 91 on the rear edge of the member through the plate opening 70 toward the clamping jaws 71 and 72 (Figure 10). The bar 91 has on the upper face thereof a laterally extending row of closely spaced pins 92, 92, which project through a series of apertures 93, 93 in an elongated portion 94 having downwardly extending flanges 95 at opposite ends of the same pivotally connected at 96 to the member 85. The apertured portion 94 is normally held against the pin bar 91 by springs 97 engaging between extensions 98 and 99 of member 85 and elongated portion 94 forwardly of the pivots 96. The edge of a bed sheet S, for example, is adapted to be attached to the row of projecting pins 92 with a marginal portion thereof extending freely rearwardly, as shown in chain-dotted lines in Figure 10, and by sliding the member 85 rearwardly as described to engage the projecting edge of the sheet S between the clamping jaws 71 and 72 while the same are held open by the operator stepping on pedal 82 against the action of spring 77. Upon releasing pedal 82 the jaws 71 and 72 will clamp the edge of the sheet to restrain the same, after which the sheet is released from pins 92 by the operator pressing down on the extensions 98 yieldingly to spread the movable element 94 apart from relatively fixed member 91. The member 91 and element 94 may be maintained in this spaced apart relationship during subsequent sheet-folding and pressing operations, as by means of levers 101 of springy material pivoted to member extensions 99 and having cam portions 102 engageable by the outer edges of element extensions 98 until shoulders 103 are in stop engagement with the upper edges of said extensions 98. This maintains the pins 92 unexposed to accidental damaging engagement of portions of a sheet as it is progressively moved between the pressing plates. The pins are easily set in exposed positions for starting a subsequent sheet folding and pressing cycle by the operator urging the levers 101 laterally outwardly to permit springs 97 to reengage element 94 with member 91.

With the marginal edge of a sheet S clampingly restrained between jaws 71 and 72 the operator may manually yieldingly hold the remainder of the sheet in horizontally distended condition while the upper plates 34 to 36 are progressively lowered as described to fold the sheet accordion style. In order to allow the operator to control more than one machine, however, improved means is provided for mechanically feeding or releasing the sheets into the folding and pressing plates.

To this end, as best shown in Figures 1, 4, 5, 6, 10, 18 and 19, an elongated rod 105 is mounted to extend laterally in front of the machine and to be suitably power operated from a position in front of the platen 29 and pin bar 94 just above the upper edge thereof, to an elevated position near the top of the machine, the trailing portion of a sheet S having its leading edge clamped in jaws 71 and 72 being adapted to be draped in distended condition over the rod 105 in a manner which permits it to be freely drawn into the machine during the progressive folding operations, and yet maintaining the thus doubled portion of the sheet substantially in a vertical plane and therefore utilizing a minimum of space.

For operating the rod 105 for this purpose, it is supported at laterally opposite ends on the upper ends of piston rods 106, 106 vertically reciprocable in elongated cylinders 107, 107 which are attached near the upper ends thereof to the flatwise movable platen 29, as by means of brackets 108, and pivoted at the lower ends thereof to the fixed uprights 38 and 39, as indicated at 109, this construction maintaining the cylinders in vertical position but allowing the same to follow the limited horizontal movement of platen 29. The arrangement is such that the operator after having attached the sheet S to the clamping jaws 71 and 72 allows the sheet to extend flatwise over the rod 105 and then through valve means, to be described later, applies pressure to the cylinders 107 to urge piston rods 106 upwardly to the chain-dotted position of rod 105 shown in Figure 4. Suitable valve means to be described may be provided to bleed pressure fluid from the cylinder 107, and slowly lower the rod 105 as the trailing portion of sheet S is progressively folded in the machine, so that when the folding cycle has been completed the rod 105 will be back in the fully lowered position best shown in Figures 1 and 10.

For the purpose of preventing the trailing end of sheet S from becoming entangled in the lower portions of the machine a flat plate 111 is arranged in a vertical plane beneath the rod 105 and supported to move vertically therewith, as by being fixedly secured at opposite upper corners thereof to the piston rods 106 and slidably attached at the opposite lower corners thereof to the cylinders 107 (see Figures 1 and 10).

As previously mentioned, means is provided herein for automatically controlling the progressive lowering of the upper plates 34 to 36 to fold a sheet. Accordingly, referring to Figures 1, 4, 13 to 17 and 19, vertically adjustably supported directly beneath the bottom plates 26 to 29 may be a stop member 112 (Figures 1, 13 and 14), including spaced plates 113, 114 and 115, providing spaces 116 and 117 within which may be received the lower edge portions of the relatively vertically fixed plates 27 and 28. The upper edges of the stop plates 113 to 115 are concaved for self-centering engagement of convex lower edges of the upper plates 34 to 36 therewith to limit downward movement of the respective upper plates.

Figures 13, 14, 15, 16, 17:
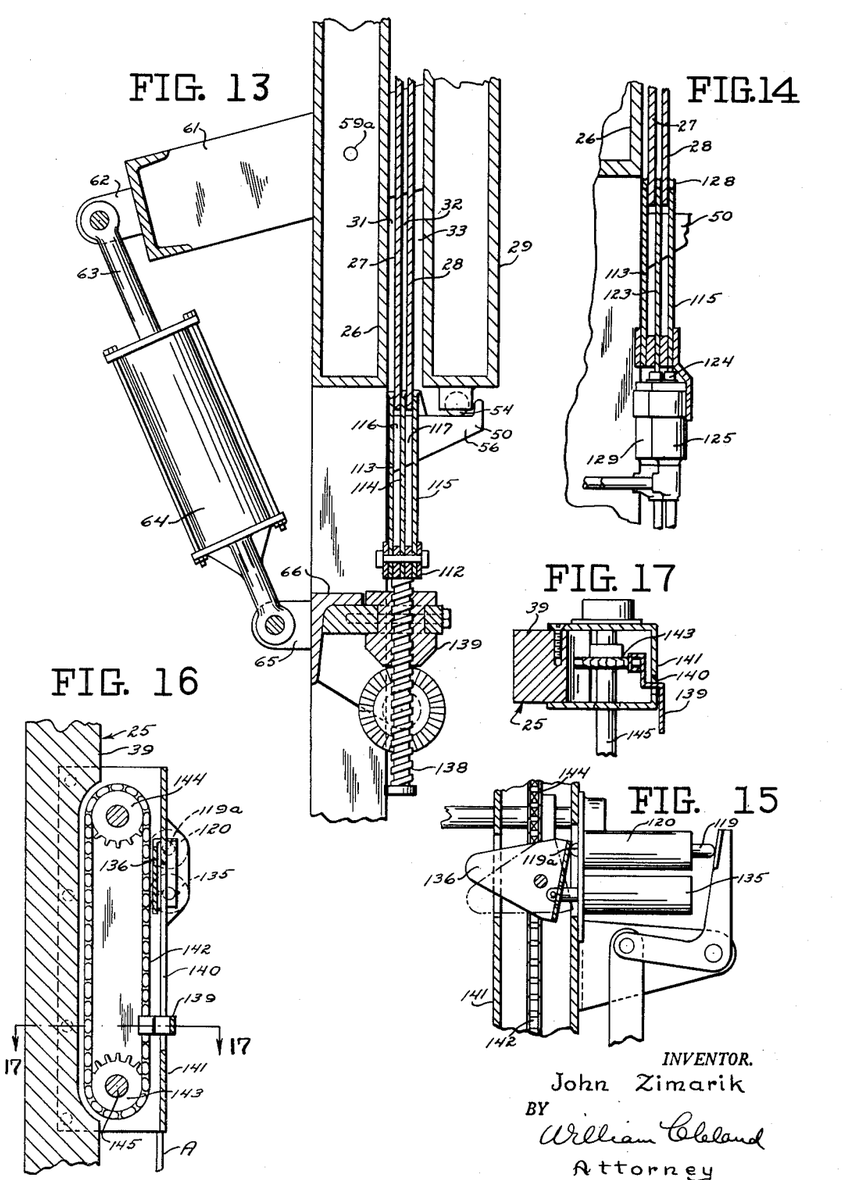
Fig. 13 is a fragmentary vertical cross-section, taken substantially on the line 13—13 of Fig. 1, and illustrating the adjustable stop means for the pressure plate and a portion of the means for applying pressure to the sheets to be folded.
Fig. 14 is a fragmentary vertical cross-section taken substantially on the line 14—14 of Fig. 1, and illustrating another portion of the stop means as well as a portion of the automatic control means.
Fig. 15 is a fragmentary view, partly broken away and in section, illustrating a portion of the sheet-indexing mechanism at A in the lower right-hand corner of Fig. 1.
Fig. 16 is a fragmentary vertical cross-section of the same mechanism substantially as viewed along the line 16—16 of Fig. 1.
Fig. 17 is a horizontal cross-section taken substantially on the line 17—17 of Fig. 1.

Automatically progressive lowering of these upper plates is accomplished by depression of a foot lever 118 suitably connected to operate a yieldingly depressible pin 119 of a valve 120 (Figures 1, 15 and 19). As best shown in Figure 19, depression of pin 119 operates valve 120 to supply pressure fluid from a suitable source (not shown) through lines 121 and 122 to the pair of cylinders 47a, thereby to operate the pistons 46 thereof to lower the rearmost plate 34, against the pull of counterweights 41, until the bottom of this plate comes into limiting engagement with plate 113 of stop means 112.

Simultaneously with actuation of valve 119 to operate the first pair of cylinders 47a, through pressure in line 122a, the two cylinders 107 are also operated to raise rod 105 over which the operator will have draped the sheet S, as best shown in chain-dotted lines in Figure 4. Before plate 34 moves into final stop position the lower edge thereof also engages the upper end of a slide 123, which is vertically slidably mounted on stop means 112, and urges the same downwardly to depress a spring-pressed pin 124 of a valve 125 supported on said stop means, thereby to open the valve (Figures 1, 14 and 19). This movement of plate 34 between bottom plates 26 and 27 is effective to form the first fold in sheet S.

Opening valve 125 supplies pressure fluid through lines 126 and 127 to a second pair of cylinders 47b, 47b, to start the downward movement of the second plate 35 between bottom plates 27 and 28, to make the second accordion fold in sheet S. As the plate 35 moves into final-stop engagement with the top of plate 114 of stop means 112, a second slide 128 is engaged as before with a spring-pressed pin of a valve 129, and thereby through lines 126 and 130 to supply pressure fluid to the third pair of cylinders 47a, 47a and through the pistons 46 thereof to urge the third plate 36 downwardly between plates 28 and 29 for forming a third accordion fold in sheet S, this movement of the plate 36 being limited as before by engagement with the top of stop plate 115 on stop means 112.

As the plate 36 thus moves into final limiting engagement, it urges a third slide 131 downwardly in stop means 112, to actuate a valve 132 (Figures 1 and 19) and thereby, through lines 126 and 133, to actuate the piston of cylinder 64 (Figures 4 and 13), which through cam arm 59 urges heated platen 29 flatwise toward fixed platen 26, which is also heated, for ironing a sheet S which has been accordion-folded between the interfitted upper and lower plates.

For controlling the bleeding of pressure fluid from the cylinders 107, and thereby allowing the sheet-supporting rod 105 to lower gradually during the folding steps previously referred to, a bleeder valve 135 is mounted slightly below the valve 120. This latter valve is opened at the beginning of the cycle of operation of the apparatus, by operation of pedal 118 to depress pin 119 inwardly, as described above, an extension 119a of pin 119 then setting a pivoted lever 136 to open the bleeder valve, and thereby slowly release the pressure fluid from cylinders 107 for the purposes described. After a folded sheet S has been fully ironed the operator by manually flipping the lever 136 downwardly from the chain-dotted to the full-line positions of Figure 15, closes valve 135 to the exhaust and opens valve 120 to full exhaust, which quickly releases the pressure from all of the cylinders 47 and allows the pairs of weights 41 to 43 to raise the top pressing plates 34 to 36 to open or inoperative positions thereof. By then releasing clamping jaws 71 and 72 the folded and pressed sheet is then removable upwardly from between the bottom plates 26 to 29, and the apparatus is ready for another cycle of operations upon another sheet S.

The vertical adjustment of the stop means 112 referred to above, is necessary to provide accordion folds of depth proportioned according to the lengths of the sheets S operated upon, which lengths may vary from ninety inches to one-hundred-ten inches. As shown in Figures 1, 13, 16 and 17, this may be accomplished by the stop member 112 being fixed on the top of a vertical screw shaft 138 threaded in a nut 139 which is non-rotatably secured to the fixed cross-piece 66 of framework 25. The screw shaft 138 may be vertically adjusted by the operator manually moving a finger 139 along a vertical slot 140 in a casing 141, this finger being fixed on an endless chain 142 engaged over vertically spaced sprockets 143 and 144 rotatably mounted in casing 141 and movement of the finger being translated to screw shaft 138 through a shaft 145 to one end of which sprocket 143 is keyed, and gearing 146 between the other end of the shaft 145 and said screw shaft 138. Each one-inch movement of finger 139, indicated by index marks M on casing 141, will correspond to an adjustment, for example, of a difference of six inches in the length of sheets S. The indexing marks M are so located with reference to the rod 105 that at the start of a sheet folding operation, after lever 118 has been pressed and rod 105 has moved to the top position thereof, an experienced operator may hold the trailing edge of the sheet in vertically taut condition from rod 105 and quickly relocate the finger 139 to correspond to the effective length of the sheet, and the correct limiting position of the stop member 112 will be automatically set without further manipulation of the apparatus. Of course, when all sheets S are of the same length only one such adjustment is necessary.

Figure 20:
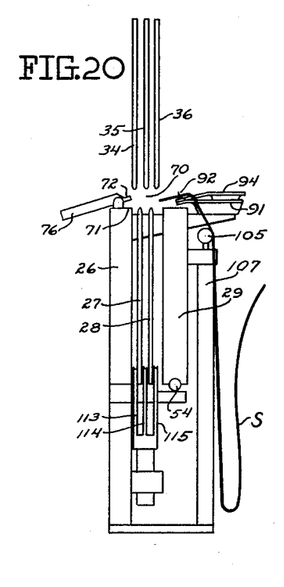
Figs. 20 to 25 are diagrammatic, fragmentary views, illustrating the various steps in the operation of the apparatus for folding and pressing a sheet.
Figure 21:
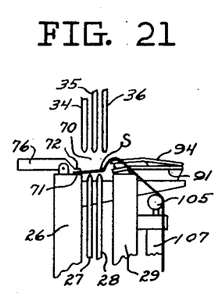
Figure 22:
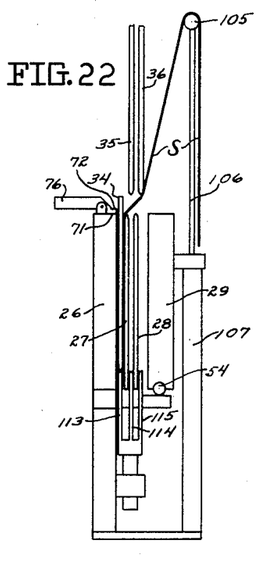
Figure 23:
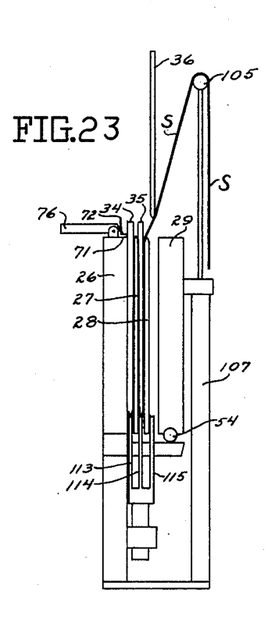
Figure 24:
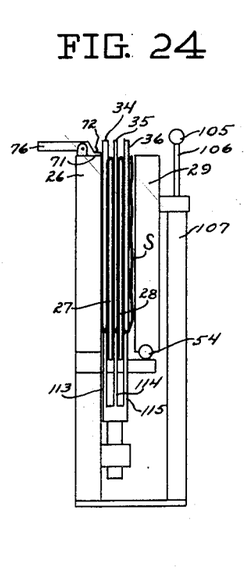

A summary of the operation of the apparatus will be best understood by particular reference to Figures 20 to 25 which illustrate diagrammatically the progressive steps of the method of practicing the invention. First the operator attaches the leading edge of a sheet S to the freely projecting pins 92 of sliding member 91, while supporting the trailing end portion of the sheet in any suitable manner, this step being illustrated in Figure 20 corresponding to Figure 10. In Figure 21 the operator has moved the slidable member 94 rearwardly and back, to release the freely projecting marginal portion of the sheet S through plate opening 70, into the clamping jaws 71 and 72, operated by foot pedal 82. With the sheet S thus restrained, by the clamping jaws, the operator, by withdrawing the pins 92 and holding the same withdrawn by means of the catch levers 101, next operates valves 120 and 135 (see Figures 15 and 19), by means of foot pedal 118, to actuate the pairs of cylinders 47a, 47b and 47c in sequence, successively to lower the upper pressing plates 34, 35 and 36, respectively. Figure 22 shows the movable plate 34 in lowered position between bottom plates 26 and 27 and against stop plate 113, to provide the first accordion fold in the sheet, while the trailing end portion thereof is releasably supported in smooth or distended condition over the rod 105, which is now slowly moving downward as previously described. Upon reaching its bottom limit, plate 34 will have engaged slide 123 to operate valve 125 (Fig. 19) and thereby initiate downward movement of plate 35 for forming the second accordion fold, as shown in Figure 23, wherein the roll 105 has moved downwardly in proportion to the free movement of the sheet S into the presser plates. In this position of plate 35, it in turn will have engaged stop plate 114 and also will have moved slide 128 to operate valve 127. Operation of this valve starts downward movement of the third top plate 36 from the position thereof of Figure 23 to the position of Figure 24, wherein the third and final accordion fold is made, and rod 105 is near the bottom of its stroke.

Figure 25:
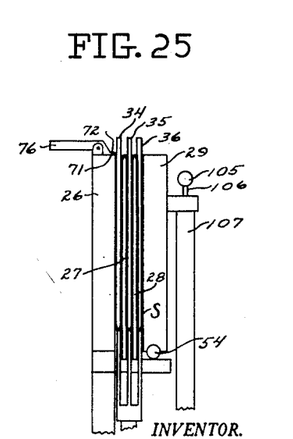

Movement of plate 36 into stop position thereof against stop plate 115 engages slide 131 to operate valve 132 and in turn to operate cylinder 64 to clamp the interfitting upper and lower plates flatwise together, and thereby under the influence of heat conducted from the heated platens or plates 26 and 29 to iron the sheet S in accordion folded condition, as shown in Figure 25. In order that the leading edge of sheet S will be ironed or pressed, the apparatus may be easily operated so that clamping jaws 71 and 72 will release the sheet simultaneously with forming of the first accordion fold.

When the folding and ironing cycle has been completed to this point the operator may flip the lever 136 simultaneously to close bleeder valve 135 from cylinders 107 and open valve 120 to exhaust all of the plate-moving cylinders 47, which allows the pairs of weights 41, 42 and 43 to move the plates 34 to 36 to the open positions thereof of Figure 20. In this position the folded sheet S is easily removable upwardly from between the lower plates 26 to 29 and the apparatus is then ready for another sheet-folding and ironing cycle of operation.

Modifications of the invention may be resorted to without departing from the spirit thereof or the scope of the appended claims. For example, the method may be varied by yieldingly restraining opposite edge portions of a sheet held in flat, distended condition, and by means of interfitting plates starting a first accordion fold at the central portion of the sheet and progressively forming additional folds toward both ends of the sheet.

What is claimed is:

1. In apparatus for pressing sheets, a first series of substantially parallel spaced plates, a second series of substantially parallel plates, means for mounting the second series of plates to be relatively movable edgewise substantially in parallelism to closed interfitting relationship within the spaces between adjacent corresponding plates of said first series of plates, means for relatively moving said plates of said second series thereof one at a time in sequence toward said interfitting relationship and means for anchoring one end of a sheet to be pressed to have the remaining portion substantially unrestrained and extended to be sequentially engaged by said interfitting plates progressively to fold the sheet accordion style.

2. Apparatus as set forth in claim 1, including means for urging said plates together flatwise in said interfitting relationship to press a sheet thus folded between the same, and means for transmitting heat to said flatwise urged plates to press the sheet in said folded condition.

3. Apparatus as set forth in claim 2, including means for unrestrainedly supporting the sheet from the end thereof opposite to said anchored edge to follow in coordination with said progressive folding of the sheet.

4. Apparatus as set forth in claim 3, including adjusting means operable to adjust the extent of said closed interfitting relationship of the first and second series of plates and thereby to regulate the extent of the folds of the sheet according to the length of the sheet.

5. In apparatus for pressing sheets, a supporting framework, a plurality of spaced plates extending substantially in parallelism in vertical planes, said plates being mounted in said framework to be relatively fixed in the vertical but being relatively movable toward and from each other flatwise, a plurality of vertically relatively movable plates mounted in said framework, means for vertically relatively moving said vertically movable plates sequentially toward positions interfitting between successive pairs of adjacent faces of said relatively fixed plates, progressively to fold a sheet between the interfitting plates in accordion style, and means for urging said relatively fixed and said relatively movable plates together flatwise to press the accordion-folded sheet.

6. Apparatus as set forth in claim 5, including heating means relatively movable with said flatwise movement of said plates to pressing position for heating said plates for the pressing operations.

7. Apparatus as set forth in claim 6, including releasable clamping jaws for anchoring one edge of a said sheet while the remainder is held freely in the path of the sequentially moved plates.

8. Apparatus as set forth in claim 5 in which the planes of said plates are vertical, and including heating means relatively movable with said flatwise movement of said plates to pressing position for heating said plates for the pressing operations, releasable clamping jaws at a rear side of said framework for anchoring one edge portion of a said sheet while the remainder is held freely in the path of the sequentially moved plates, and an element extending transversely across the front side of said framework over which the trailing portion of said sheet is adapted to be draped unrestrainedly to support the same in extended condition and to move inwardly as the sheet is progressively folded between said interfitting plates.

9. Apparatus as set forth in claim 5, including heating elements relatively movable with said flatwise movement of said plates to pressing position for heating said plates for the pressing operations, releasable clamping jaws at one side of said series of plates for anchoring one edge portion of the sheet while the remainder is held freely in the path of the sequentially moved plates, and a support extending transversely across the opposite side of said series of plates over which the trailing portion of a said anchored sheet is adapted to be draped unrestrainedly to support the same in extended condition and to move inwardly as the sheet is progressively folded between said interfitting plates, said support being mounted on piston-operated means for elevating the same at the beginning of a sheet-folding operation and control means being provided to regulate the piston means to lower said element progressively as the sheet is folded.

10. Apparatus as set forth in claim 5, including heating elements relatively movable with said flatwise movement of said plates to pressing position for heating said plates for the pressing operations, releasable clamping jaws at one side of said series of plates of said framework for anchoring one edge portion of the sheet while the remainder is held freely in the path of the sequentially moved plates, a support extending transversely across the opposite side of said series of plates over which the trailing portion of a said anchored sheet is adapted to be draped unrestrainedly to support the same in extended condition and to move inwardly as the sheet is progressively folded between said interfitting plates, vertically shiftable supporting means for said support for elevating the same at the beginning of a sheet-folding cycle, and a guard plate extending downwardly with respect to said support and movable therewith for protective engagement of the trailing end of the sheet being folded.

11. Apparatus as set forth in claim 1, said moving means including separate prime movers for each said edgewise movable plate, control means for said prime movers operable to initiate said edgewise closing movement of a first of said movable plates, said control means being further automatically operable by the edgewise closing movement of each movable plate, starting with said first thereof, to initiate closing movement of the next adjacent movable plate in said one at a time sequence.

12. Apparatus as set forth in claim 1, said moving means including separate prime movers for each said edgewise movable plate, control means for said prime movers operable to initiate said edgewise closing movement of a first of said movable plates and further being automatically operable by closing the movement of each movable plate, starting with said first thereof, to initiate closing movement of the next adjacent movable plate in said one at a time sequence, said prime movers being pressure-operated piston means for operating said movable plates toward the closed positions thereof, and counter-weights being provided for returning the movable plates to open positions when the operating pressure on each piston is released.

13. Apparatus as set forth in claim 5, said relatively fixed and movable plates having a sheet-receiving space between adjacent edge portions thereof, relatively fixed and relatively movable elongated clamping jaws at the rear of said framework adapted to receive therebetween an edge of a sheet inserted through said sheet-receiving space, and an elongated member horizontally shiftably mounted at the front of said framework and including means for releasably attaching said edge portion of the sheet thereto with a substantial margin thereof extending freely, said member being rearwardly shiftable with respect to said sheet-receiving space to engage said freely extending margin of the sheet therethrough and between said clamping jaws to be clamped thereby, said device thereupon being operable to release said sheet to permit withdrawing said member with respect to said sheet-receiving space.

14. Apparatus as set forth in claim 5, said relatively fixed and movable plates having a sheet-receiving space between adjacent edge portions thereof, relatively fixed and relatively movable elongated clamping jaws at the rear of said framework adapted to receive therebetween an edge of a sheet inserted through said sheet-receiving space, and an elongated member horizontally shiftably mounted at the front of said framework and including means for releasably attaching said edge portion of the sheet thereto with a substantial margin thereof extending freely, said member being rearwardly shiftable with respect to said sheet-receiving space to engage said freely extending margin of the sheet therethrough and between said clamping jaws to be clamped thereby, said device thereupon being operable to release said sheet to permit withdrawing said member with respect to said sheet-receiving space, said member including a pair of upper and lower separable elements, the upper of which has provided therein a plurality of spaced apertures and the lower of which has thereon a plurality of pins adapted to project through said apertures for said releasable attachment of said edge portion of the sheet, said elements thereby being separable to release the sheet for said clamping engagement in said clamping jaws.

15. Apparatus as set forth in claim 5, said relatively fixed and movable plates having a sheet-receiving space between adjacent edge portions thereof, relatively fixed and relatively movable elongated clamping jaws at the rear of said framework adapted to receive therebetween an edge of a sheet inserted through said sheet-receiving space, and an elongated member horizontally shiftably mounted at the front of said framework and including means for releasably attaching said edge portion of the sheet thereto with a substantial margin thereof extending freely, said member being rearwardly shiftable with respect to said sheet-receiving space to engage said freely extending margin of the sheet therethrough and between said clamping jaws to be clamped thereby, said device thereupon being operable to release said sheet to permit withdrawing said member with respect to said sheet-receiving space, said member including a pair of upper and lower separable elements, the upper of which has provided thereon a plurality of pins adapted to project through said apertures for said releasable attachment of said edge portion of the sheet, said elements thereby being separable to release the sheet for said clamping engagement in said clamping jaws, said separable elements including spring means tending to urge the same apart and a releasable catch for maintaining the same together against the action of said spring means.

16. Apparatus as set forth in claim 5, including plate-adjusting means for adjusting the extent of said closed interfitting relationship of said relatively fixed and relatively movable plates and thereby to regulate the depth of the folds as for sheets of different lengths.

17. Apparatus as set forth in claim 5, including plate-adjusting means for vertically adjusting the interfitting relationship of said relatively fixed and relatively movable plates to vary the depth of the folds for sheets of different lengths, said plate-adjusting means comprising a stop having portions engageable by the bottom edges of the vertically movable plates in the closed positions thereof, and screw means for raising and lowering said stop.

18. Apparatus as set forth in claim 5, including plate-adjusting means for vertically adjusting the interfitting relationship of said relatively fixed and relatively movable plates to vary the depth of the folds for sheets of different lengths, said plate-adjusting means comprising a stop having portions engageable by the bottom edges of the vertically movable plates in the closed positions thereof, screw means for raising and lowering said stop, and an indexing device having a fixed part and a part movable with respect thereto and adapted to adjust said screw means, said movable part having an extension thereon for indicating adjustments of the screw means with respect to the length of the sheet to be folded.

19. Apparatus as set forth in claim 5, including plate-adjusting means for vertically adjusting the interfitting relationship of said relatively fixed and relatively movable plates to vary the depth of the folds for sheets of different lengths, said plate-adjusting means comprising a stop having portions engageable by the bottom edges of the vertically movable plates in the closed positions thereof, and an indexing device having a fixed part and a part movable with respect thereto and adapted to adjust said screw means, said movable part having an extension thereon for indicating adjustments of the screw means with respect to the length of the sheet to be folded, said indexing means being arranged with respect to said relatively fixed and movable plates whereby said extension of the indexing device is operable to coincide with the trailing edge of the sheet correspondingly positioned for the start of a folding operation thereon and thereby through said movable part and screw means to adjust said stop for the desired folding depths of the sheet.

20. In apparatus for pressing sheets, a supporting framework, a plurality of spaced plates extending substantially in parallelism in vertical planes, said plates being mounted in said framework to be relatively fixed in the vertical but being relatively movable toward and from each other flatwise, a plurality of relatively movable plates mounted in said framework to be sequentially moved toward positions interfitting between successive pairs of adjacent faces of said relatively fixed plates, progressively to fold a sheet between the interfitting plates in accordion style, means for urging said relatively fixed and said relatively movable plates together flatwise to press the accordion-folded sheet, means for heating said plates for the pressing operations, and releasable clamping jaws for restraining one edge of the sheet while it is progressively accordion-folded between the plates, said clamping jaws being at one side of said vertically movable plate, and releasable means being provided on the opposite side of said vertically movable plates for feeding said edge of the sheet under the vertically movable plates in the raised position thereof to receive said edge of the sheet between said clamping jaws.

21. In apparatus for pressing sheets, a first series of substantially parallel spaced pressing members each having side pressing surfaces of substantially broad lateral area, a second series of substantially parallel pressing members each having an elongated leading edge portion, means for mounting the second series of pressing members to be relatively movable edgewise substantially in parallelism to closed interfitting relationship in which said leading edge portions are received to a substantial depth within the spaces between adjacent corresponding pressing members of said first series of pressing members, means for relatively moving said pressing members of said second series thereof one at a time in sequence toward said interfitting relationship, and means for anchoring one end of a sheet to be pressed to have the remaining portion substantially unrestrained and extended to be sequentially engaged by said interfitting pressing members progressively to fold the sheet accordion style.

JOHN ZIMARIK.

References Cited in the file of this patent

UNITED STATES PATENTS

| Number | Name | Date |
|---|---|---|
| 454,798 | Honeyman | June 23, 1891 |
| 883,793 | Engberg | Apr. 7, 1908 |
| 1,824,073 | Burdick | Dec. 11, 1929 |
| 1,982,454 | Sanders | Nov. 27, 1934 |
| 2,445,504 | Williams | July 20, 1948 |

FOREIGN PATENTS

| Number | Country | Date |
|---|---|---|
| 546,731 | Great Britain | July 28, 1942 |